(12) United States Patent
Hipp

(10) Patent No.: US 10,291,811 B2
(45) Date of Patent: May 14, 2019

(54) RECORDING OF DISTANCE PROFILES

(71) Applicant: Triple-IN Holding AG, Zug (CH)

(72) Inventor: Johann Hipp, Hamburg (DE)

(73) Assignee: TRIPLE-IN HOLDING AG, Zug (CH)

( * ) Notice: Subject to any disclaimer, the term of this patent is extended or adjusted under 35 U.S.C. 154(b) by 0 days.

(21) Appl. No.: 15/650,050

(22) Filed: Jul. 14, 2017

(65) Prior Publication Data

US 2018/0020115 A1 Jan. 18, 2018

(30) Foreign Application Priority Data

Jul. 15, 2016 (DE) .......................... 10 2016 113 149

(51) Int. Cl.
*H04N 1/193* (2006.01)
*G01S 7/481* (2006.01)
*G01S 17/42* (2006.01)
*G01S 7/486* (2006.01)

(52) U.S. Cl.
CPC ......... *H04N 1/1934* (2013.01); *G01S 7/4815* (2013.01); *G01S 7/4817* (2013.01); *G01S 7/4863* (2013.01); *G01S 17/42* (2013.01); *H04N 1/1931* (2013.01); *H04N 1/1938* (2013.01)

(58) Field of Classification Search
CPC .. H04N 1/1934; H04N 1/1931; H04N 1/1938; G01S 7/4817; G01S 7/4815; G01S 7/4863; G01S 17/42
USPC ........................................................ 358/496
See application file for complete search history.

(56) References Cited

U.S. PATENT DOCUMENTS

| 2008/0186470 A1* | 8/2008 | Hipp ....................... G01S 7/481 356/5.08 |
| 2011/0095170 A1* | 4/2011 | Erb ........................ G01S 17/026 250/214 R |
| 2011/0098970 A1* | 4/2011 | Hug ....................... G01F 23/284 702/159 |

(Continued)

FOREIGN PATENT DOCUMENTS

| DE | 4433082 A1 | 4/1995 |
| DE | 102014118055 A1 | 6/2016 |

OTHER PUBLICATIONS

German Search Report for related German Application No. 102016113149.0; dated May 4, 2017; 2 pages.

*Primary Examiner* — Allen H Nguyen
(74) *Attorney, Agent, or Firm* — Cantor Colburn LLP

(57) ABSTRACT

An apparatus for recording distance profiles respectively having a plurality of distance image points comprises: (i) a plurality of transmitters arranged in an array respectively for the transmission of electromagnetic radiation into a recording region; (ii) at least one reception unit for the detection of radiation reflected from the recording region; (iii) an evaluation unit for determining distances of objects at which transmitted radiation is reflected, with the distances each forming a distance image point; and (iv) a deflection unit which deflects the transmitted radiation within a scanning angle region into a scanning direction in order to consecutively generate, per distance profile, a plurality of scanning patterns of distance image points that are displaced against one another in the scanning direction and that each image the transmitter array, wherein at least a few of the distance image points are spaced apart from one another in the scanning direction.

20 Claims, 8 Drawing Sheets

(56) References Cited

U.S. PATENT DOCUMENTS

Figure 1:
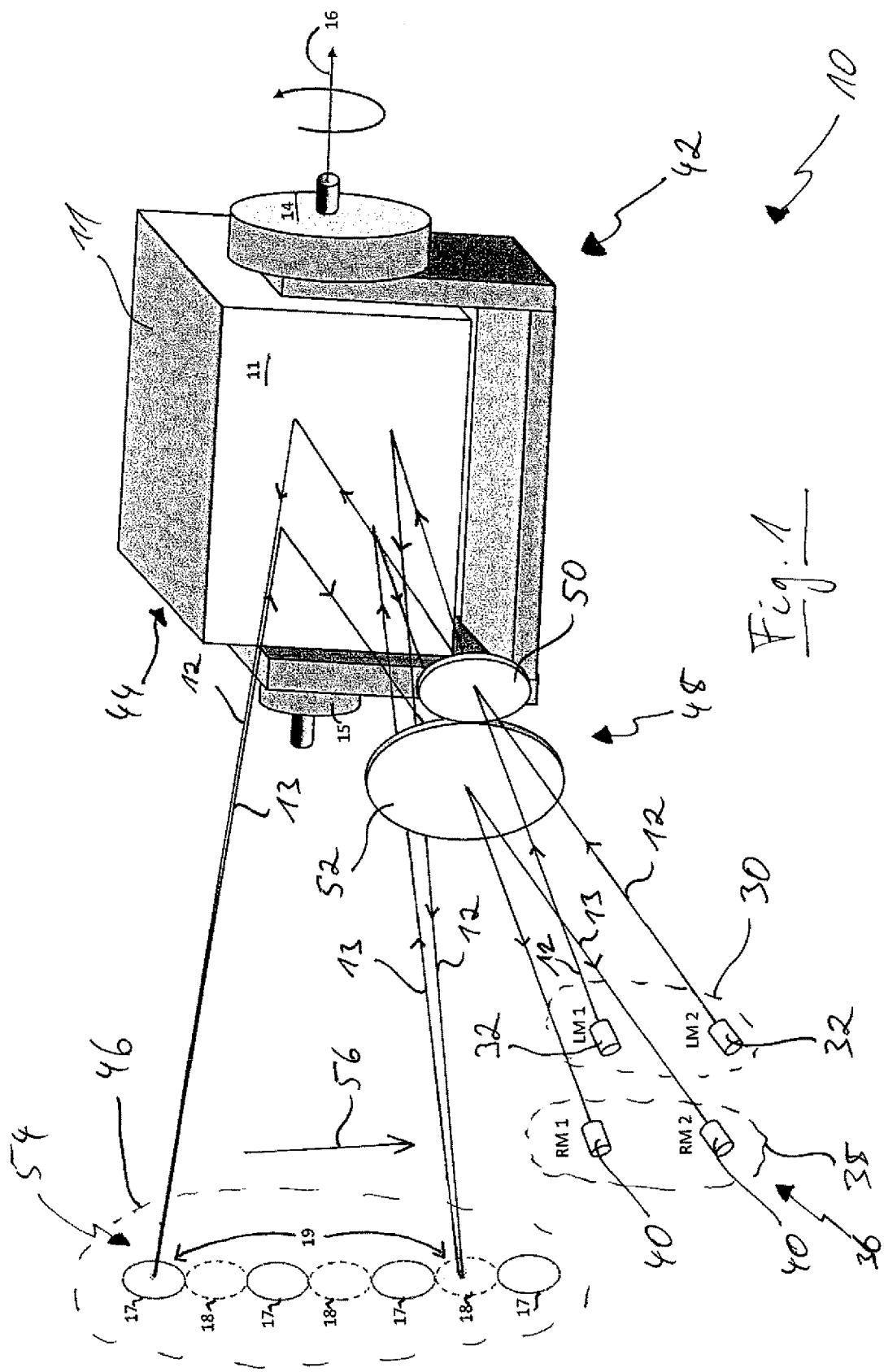

| | | | |
|---|---|---|---|
| 2013/0229668 A1* | 9/2013 | Werber | G02B 26/005 356/614 |
| 2014/0078519 A1* | 3/2014 | Steffey | G01S 7/4817 356/625 |
| 2015/0077760 A1* | 3/2015 | Koerner | G01B 9/02008 356/496 |

* cited by examiner

RECORDING OF DISTANCE PROFILES

CROSS-REFERENCES TO RELATED APPLICATIONS

This patent application claims the benefit of priority to German Patent Application Serial No. 102016113149.0, filed Jul. 15, 2016, which is incorporated herein by reference in its entirety.

The present invention relates to an apparatus, as well as to a method for recording distance profiles respectively having a plurality of distance image points, comprising a plurality of transmitters arranged in an array respectively for the transmission of electromagnetic radiation into a recording region, at least one reception unit for the detection of radiation reflected from the recording region, as well as an evaluation unit for determining distances of objects at which the transmitted radiation is reflected, with the distances each forming a distance image point.

Distance profiles are, for example, determined in order to optically detect objects, this means by means of electromagnetic radiation of a visible or non-visible wavelength. An aim can consist therein to optically scan the surface of a respective object at discrete measurement points and to draw conclusions on the geometric state, in particular the size of an object or even on the object type, on this basis. The scanning of a respective object thus in particular takes place by way of a localization of surface points at the object, e.g. by means of laser and a measurement of the time of flight of a laser beam from the apparatus to a distance image point at the object and back.

So-called line scanners are known that comprise a pulsed laser source whose laser pulses are repeatedly deflected by way of a rotating mirror for carrying out a scan, in order to successively determine a plurality of distance image points over a scanning angle in a scanning direction. The distance image points of a scan then form a respective distance profile which represents the pointwise detected distance of the object—presupposing an object is present in the "viewing field" of the scanner. The corresponding distance image points lie on a line from the point of view of the scanner in such a way that one can talk of a two-dimensional scanning of the object or of a profile.

In as far as an object to be scanned moves relative to the apparatus, a plurality of distance profiles can be consecutively determined in time which can algorithmically be completed to a three-dimensional surface profile of the object. In this way it is, for example, possible with the aid of the apparatus to automatically count, measure and/or to classify objects positioned at a conveyor belt, such as pieces of luggage or parcels of goods. In a different case of application stationary objects, e.g. a tunnel tube, can be measured in that the apparatus is moved relative to the object.

In particular in the case of a relative movement between an object to be detected and the apparatus, increased demands on the scanning speed (scanning rate) exist, this means the rate at which the apparatus can determine distance profiles. For example, in the framework of an application of the apparatus as an object counter, it must be ensured that a moved object is scanned by way of at least one distance profile, as the object would otherwise in the unfavorable case of application pass "unnoticed" between two consecutively recorded distance profiles. In particular the speed and size of the objects to be detected are decisive for the question of the required scanning speed. Moreover, if the surface of an object should be scanned with a predetermined resolution, then the scanning speed must be correspondingly increased.

The term resolution in the framework of this disclosure relates to an angular spacing between two distance image points. In this way the resolution is not dependent on the spacing of the objects from the apparatus. However, the absolute spacing between two adjacent distance image points enlarges as the spacing of the object from the apparatus increases.

The scanning speeds that can be realized by way of common scanning apparatuses are frequently not sufficient for the detection of fast objects respectively possibly only at the expense of a reduced resolution (less distance image points per distance profile). On the one hand, this is due to the limited frequency or pulse rate with which currently available transmitters transmit electromagnetic radiation, in particular laser pulses, into the recording region. On the other hand, the speed with which the transmitter and/or the transmission beams can be moved over the scanning angle for recording the distance profiles is limited for reasons of construction, in particular with regard to mechanical loads.

There is a need for an apparatus of the initially mentioned kind with which a high scanning speed for a simultaneously high resolution can be achieved.

This object is satisfied by an apparatus having the features of claim 1.

In accordance with the invention the apparatus comprises a deflection unit which deflects the scanning radiation within a scanning angle region into a scanning direction in order to consecutively generate, for each distance profile, scanning patterns of distance image points that are displaced against one another in the scanning direction and that each image the transmitter array. At least a few of the distance image points are spaced apart from one another in the scanning direction in the scanning patterns.

The invention is characterized by way of a clever interplay between the deflection unit, on the one hand, and the advantageously configured scanning patterns, on the other hand. The deflection unit permits a stationary arrangement, this means a fixed arrangement, of the transmitter array and of the reception unit relative to the apparatus which has been found to be favorable with regard to a simple construction of the apparatus. In order to displace the scanning pattern imaging the transmitter array, preferably only the deflection unit is moved that can be adapted in a particular way for this purpose, as will be described in more detail in the following. Furthermore, the distance image points for a respective scanning pattern are at least partly spaced apart from one another in the scanning direction. In other words, the distance image points are arranged distributed in the scanning direction. A scanning pattern hereby already covers a part of the scanning angle region to be scanned which is why a respective scanning pattern can generally be produced faster and the distance profile resulting from the scanning pattern can be recorded faster and more efficiently. The scanning speeds that can be realized with an apparatus in accordance with the invention can thus already be increased due to the distance of the image points that are spaced apart in the scanning direction. In contrast to this the scanning speed can still be further increased by using the deflection unit, as will be described in more detail in the following.

The respective distances of the distance image points are, for example,—as already indicated above—determined by measuring the time of flight of radiation. This can, for example, be realized with transmitters configured as laser sources that transmit a plurality of laser pulses. From the time of flight of these laser pulses between the transmitter and the receiver which is also abbreviated as TOF, the respective distances can be calculated. Alternatively or additionally the transmitters can also e.g. transmit continuous radiation and/or the distances can be determined by means of a phase shift between transmitter and receiver.

Embodiments of the invention are disclosed in the following, as well as in the dependent claims.

A respective scanning pattern can have a maximum longitudinal extent and a maximum transverse extent perpendicular to the longitudinal extent in the scanning direction, with the transverse extent being smaller than the longitudinal extent, in particular a multiple times smaller than the longitudinal extent.

The scanning pattern can thus be configured as elongate, wherein the longitudinal extent is preferably in parallel to the scanning direction. The distance image points can in particular lie on a straight line in a respective scanning pattern that extends at least essentially in parallel to the scanning direction. When the distance image points lie on a straight line that extends in the scanning direction a so-to-say real "line scan" is carried out, this means the resultant distance profile extends in a plane from a spatial point of view.

In accordance with a further embodiment the distance image points of a respective scanning pattern are uniformly spaced apart. An advantage lies therein, that the offset between the scanning patterns can be set as constant in such a way that a uniform spacing between the corresponding distance image points is achieved for the resultant distance profile. In other words a constant resolution of the distance profile in the scanning direction can be achieved in a more simple manner, this means with a constant offset between the scanning patterns.

The spacing between adjacent distance image points of a respective scanning pattern can be determined in dependence on the maximum width of the bunch of radiation transmitted by the transmitters. The maximum width of this bunch of radiation is, on the one hand, determined by way of the predefined divergence of the bunch of radiation at the transmitter side and the optics present downstream thereof, however, on the other hand, also by way of the spacing between the apparatus and an object to be detected at which the bunch of radiation is reflected. The spacing between adjacent distance image points of the scanning pattern can thus be selected on consideration of the effective divergence of the bunch of radiation and the maximum "scanning distance". Preferably, the spacing is selected so large that distance image points generated in a scanning pattern with respect to the associated bunches of radiation do not intersect at the distance image points. The spacing can thus also be selected larger than the width and/or the cross-sectional extent of the bunch of radiation, in particular in order to avoid an optical cross-talk between adjacent bunches of radiation also under unfavorable optic conditions.

In accordance with a further embodiment it is provided that at least a few of the scanning patterns of a respective distance profile overlap one another. This means that the offset between consecutively recorded scanning patterns is selected in such a way that at least one distance image point of the later recorded scanning pattern falls in the region of extent of the previously recorded scanning pattern. In particular a later recorded scanning pattern can have distance image points that—viewed in the scanning direction—lie between distance image points of the previously recorded scanning pattern. In this way the scanning patterns can be partly stacked within one another viewed in time. As a result this enables advantageous configurations in such a manner that the spacing between adjacent distance image points of a scanning pattern can practically be arbitrarily increased if required without having to reduce the spacing between distance image points of the distance profile for this. Rather comparatively coarse scanning patterns can be generated that can complement one another to a finely resolved distance profile, with the individual distance image points of the distance profile not having to be generated strictly sequentially along the scanning direction in time, this means they do not have to be generated after one another. Thus, the distance image points can initially, e.g. be written into a buffer space in the course of a scanning process. When all of the scanning patterns respectively required for a distance profile are generated and the corresponding distance image points have been saved, these can commonly be read out and on consideration of the respectively associated scanning angle and the overlap of the scanning patterns be completed to the distance profile. This means that the distance image points of all scanning patterns are sorted in accordance with their respective ascending angle.

The distance image points of a respective distance profile can be uniformly spaced apart. In other words, the scanning patterns of a respective distance profile can be complemented to a uniformly spaced apart sequence of distance image points. Preferably most, ideally all of the distance image points of the distance profile are uniformly spaced apart in order to avoid deviations in the resolution.

In accordance with a preferred embodiment the spacing between adjacent distance image points of a respective scanning pattern is larger than the spacing between adjacent distance image points of a respective distance profile. As indicated in the foregoing, the resolution of the scanning pattern can thus be significantly lower than the resolution of the resultant distance profile. This provides the basis for a plurality of advantages: On the one hand, the distance image points of an individual scanning pattern can be generated with a high quality, as optical interference between adjacent distance image points, in particular optical cross-talk, can be reduced on the basis of the spacing which generally leads to a more precise scanning performance. On the other hand, the scanning speed can be driven to so far unknown heights. When the scanning pattern already covers a comparatively large part of the scanning angle due to a large spacing between the respective distance image points, the complete scanning angle region can in particular be scanned "in a coarse manner" with a large shift in an extremely short period of time. This is particularly interesting in such cases in which one can omit a high resolution of the distance profile and rather a maximum scanning speed is desired, for example, for counting objects moving particularly fast. The distribution of the distance image points over a significant part of the scanning angle region thus creates an elegant possibility for a highly rapid "coarse scan".

A distribution of the distance image points in the scanning direction however does not mean that merely a "coarse scan" can be carried out with the apparatus. The speed of the deflection unit and the transmitters controlled in dependence on the rotating angle can naturally be set to also carry out a highly resolved "fine scan". In other words, one and the same apparatus can be flexibly configured in order to satisfy the requirements with respect to scanning speed and resolution of the distance profiles in the best possible way.

The offset between two consecutive scanning patterns is preferably equal to the product of the number of distance image points of a respective scanning pattern and the spacing between adjacent distance image points of a respective distance profile. In this way a uniformly resolved distance profile—presupposing a constant set offset—can be recorded with a minimum number of scanning patterns, this means double scans by way of two consecutively generated identical distance image points or gaps due to missing distance image points can be avoided. This is insofar true as that the spacing between adjacent distance image points of a respective scanning pattern are not arbitrary as will be described in more detail in the following.

In accordance with a preferred embodiment the following is true for the spacing d between adjacent distance image points of a respective scanning pattern:

$$d = 2 \cdot (A+k) - 1$$

Hereby A is the number of distance image points of the scanning pattern and k is a spacing factor from the group of non-negative whole numbers, this means $k = \{0, 1, 2, 3, \ldots\}$. The spacing d is given in multiples of the spacing between adjacent distance image points of a respective distance profile. The above equation for the spacing d between adjacent scanning pattern distance image points ensures a high scanning efficiency in that respective distance image points are merely generated once, this means that no double scanning is carried out. This occurs under the condition that the offset, as mentioned above, is equal to the product of the number of distance image points of a respective scanning pattern and a spacing between adjacent distance image points of a respective distance profile.

The deflection unit can advantageously comprise a rotating mirror. In particular, the deflection unit comprises a polygonal mirror rotatable about an axis rotation that has n deflection surfaces that can consecutively be impinged by the transmitted radiation and that each at least approximately cover the same angular range of at least approximately 360°/n, with preferably n=2, 3, 4, 5, 6, 7 or 8, in particular n=2, 4 or 6. By means of the so configured deflection unit, distance profiles can be recorded directly after one another, this means that an intermediate "rewind" or a further rotation of the polygonal mirror into a starting position is not necessary. For this reason, on the one hand the rotational speed of the polygonal mirror—at the same scanning rate—can be reduced and indeed by the number of the scanning surfaces. Should, for example, an angular range of 90° be scanned then the rotational speed of the polygonal mirror can be reduced by the factor of four when four deflection surfaces are provided rather than one. Thus, drive means of smaller dimensions can be used for the polygonal mirror, wherein the reduced rotational speed has favorable effects on the longevity of the apparatus. On the other hand, the scanning efficiency realized by way of the multi-surface polygonal mirror can also be used to increase the scanning rate in that the rotational speed and the number of scanning patterns generated synchronized per unit in time is increased.

Preferably, the deflection surfaces of the polygonal mirror bound one another. Furthermore, the drive means for the polygonal mirror are configured to rotate this uniformly, whereby acceleration dependent mechanical loads of the apparatus are avoided.

The deflection surfaces can extend in parallel to the axis of rotation of the polygonal mirror. Hereby a rotation of the distance image points consecutively generated is avoided—i.e. a so-called "rotating image" is avoided. If, in contrast to this, the deflection surfaces were to be positioned opposite to the axis of rotation of the polygonal mirror, e.g. at an angle of 45° between the deflection surface and the axis of rotation, then the distance image points would rotate. The deflection surfaces of the polygonal mirror are preferably configured at least sectionally planar.

In accordance with a preferred embodiment the scanning angle position of the deflection unit can be detected by means of a scanning angle measurement unit. In this way the generation of the scanning patterns, this means the activation of the transmitter array in dependence on the respectively current scanning angle, can be precisely controlled.

In accordance with an embodiment the scanning angle measurement unit has a coding section coupled to the deflection unit, with the coding section having spaced apart markings, in particular with uniformly spaced apart markings. Furthermore, a detection unit stationary relative to the coding section is provided for the detection of the markings of the coding section, wherein the scanning angle measurement unit is adapted to detect the scanning angle position of the deflection unit on the basis of one or more detected markings of the coding section.

In accordance with a further embodiment the arrangement of the transmitter in the transmitter array can correspond to the arrangement of distance image points in a respective scanning pattern. The imaging of the transmitter is hereby particularly simple. For example, a filter optics for the radiation transmitted by the transmitters, as well as the deflection unit can be of particularly simple and compact design. It is understood that the arrangement does not necessarily have to be exact, e.g. quantitatively in the geometric sense be identical. Thus, the spacings between the transmitters (brought about by the optical filtering and the deflection of the transmitted bunches of radiation) can deviate from the spacings between distance image points. The arrangements can thus merely correspond qualitatively. However, this is already sufficient in order to be able to achieve the advantage of a simple and compact manner of construction.

The number of the transmitters can lie between 2 and 32, preferably between 2 and 8. Particularly preferably the number of the transmitters is 2 or 4. Furthermore, the spacing between two transmitters lying directly adjacent to one another can lie in the range of 1 to 12 mm, in particular to approximately 6 mm.

The invention further relates to a method of recording distance profiles each having a plurality of distance image points, in particular by means of an apparatus in accordance with the invention in accordance with at least one of the previously described embodiments. The method comprises the transmission of electromagnetic radiation into a recording region by means of a plurality of transmitters arranged in an array and the detection of radiation reflected from the recording region by means of at least one reception unit. The distances of objects at which the transmitted radiation is reflected are determined, with the distances each forming a distance image point. Furthermore, the transmitted radiation is deflected within a scanning angle region into a scanning direction in order to consecutively generate, for each distance profile, scanning patterns of distance image points that are displaced against one another in the scanning direction and that each image the respective transmitter array in such a manner that at least a few of the distance image points are spaced apart from one another in the scanning direction.

In accordance with an embodiment not all distance image points of a respective scanning pattern are determined at the same point in time. In other words at least a few of the distance image points of each of the scanning patterns are generated after one another in time. This can e.g. take place thereby that individual transmitters of the transmitter array transmit bunches of radiation displaced in time for determining a respective distance image point. The transmitters thus do not transmit synchronously or respectively at the same point in time. Hereby the spacing of the distance image points of a respective scanning pattern can be influenced in a desirable way. Thus, approximately one—be it for manufacturing or operating reasons—non-uniform spacing of the (physical) transmitters can simply be compensated by a correspondingly corrected control in time of the transmitters in such a way that the distance image points of a respective scanning pattern are still uniformly spaced apart. In this way, naturally alternatively also an arbitrary, respectively desired non-uniform spacing of the distance image points can be realized. The corresponding timely control of the transmitters can simply be realized by way of a software. A mechanical displacement or alignment of the physical transmitters is not demanding in effort and cost is hereby not required, this means that the "shift in time" can replace a "mechanical displacement" wherein, in the case of a deflection of the transmitted radiation by way of a rotatable mirror, the rotational speed of the rotatable mirror has to be considered. This is comparatively simple when the deflection mirror rotates with a constant speed. Theoretically the "shift in time" is however also then possible, when the rotational speed is not constant, however, its behavior in time is known.

Corresponding control schemes can, for example, be determined in the course of a calibration of the apparatus and can automatically be considered on the intended mode of operation of the apparatus. It is understood that a control scheme can be considered for the generation of all scanning patterns or merely selectively for certain scanning patterns, e.g. in dependence on the scanning angle.

Furthermore, the control does not have to take place in such a manner that adjacent distant image points are respectively delayed in time, this means that they are determined in accordance with a kind of an arpeggio. Rather, the individual transmitters can be arbitrarily controlled in dependence on their physical sequence.

The advantage of the invention also become clear with reference to the following case of application in which the surfaces of e.g. pieces of luggage on a conveyor belt should be scanned with a resolution of 2×2 cm$^2$. The conveying speed of the conveyor belt amounts to 3 meters per second (m/s). The rate of the distance profiles to be generated (scanning rate) must in this case amount to f_profile=300 cm/2 cm=150 Hz. The spacing between the scanning apparatus and the conveyor belt amounts to 5 m. Thus in the scanning direction (transverse to the conveying direction) a required angular resolution of A=2 cm/5 m=0.004 rad results. Each distance profile should, in accordance with the width of the conveyor belt, cover a scanning angle of 90 degrees=π/2 rad. The number of distance image points in this way approximately amounts to profile M_profile=(π/2 rad)/(0.004 rad) 393 per distance image. Thus, on consideration of the scanning rate M_profile·f_profile=approximately 60,000 distance image points have to be detected per second. A transmitter used for this purpose must have a transmission rate of at least 120 kHz, as the effective measurement rate generally lies significantly beneath the transmission rate, due to the numerous non-usable transmission pulses in operation, this means that the rate at which distance image points can actually be detected generally lies significantly beneath the transmission rate. Current laser diodes however possess transmission rates of merely up to 75 kHz. If in accordance with the invention now e.g. two laser diodes each having a respective transmission rate of 75 kHz are arranged in the scanning direction, then the required transmission rate of at least 120 kHz can be realized, as effectively two distance image points of the distance profile can simultaneously be detected spaced apart from one another in the scanning direction. At the same time the rotational speed of the deflection unit, that on use of merely one deflection surface is equal to the scanning rate, can be reduced by the number of deflection surfaces of the deflection unit. Thus the rotational speed of a polygonal mirror with 4 deflection surfaces has to only amount to 35.5 Hz.

It is understood that the performance capabilities of the apparatus is not limited to the parameters mentioned in the above example. Thus, the invention can also be used for significantly more performance enhanced scanning apparatus. For example, in the case of application, also a finer resolution of 1×1 cm$^2$ can be achieved, wherein a correspondingly higher scanning rate of f_profile=300 Hz as well as a transmission rate of 240 kHz can be realized without a problem with the apparatus in accordance with the invention.

The invention further relates to a method of operating, in particular for self-diagnostics, of an apparatus for recording distance profiles each having a plurality of distance image points, in particular of a recording apparatus of the kind described herein, in which the distance profiles are recorded in that electromagnetic radiation is transmitted into a recording region by means of a plurality of transmitters arranged in an array and radiation reflected from the recording region is detected by means of at least one reception unit in which distances of objects at which the transmitted radiation is reflected are determined, with the distances each forming a distance image point and the transmitted radiation being deflected within a scanning angle region into a scanning direction in order to consecutively generate, per distance profile, a plurality of consecutive scanning patterns of distance image points that are displaced against one another and that each image the transmitter array in such a manner that at least a few of the distance image points are spaced apart from one another in the scanning direction and in which, in particular a plurality of times at regular or irregular spacings in time, distance image points and/or sets of distance image points stemming from at least two different transmitters are compared to one another and a deviation lying outside of a predefinable or predefined tolerance is treated as a non-intended state, in particular as an interference or an error.

Hereby the circumstance is used that due to the plurality of transmitters so to say a plurality of parallel working "individual distance measurers" are present and that for this reason a redundancy is automatically provided that can be used to recognize a non-intended mode of operation of the apparatus. This can e.g. be founded therein that one of the transmitters or—if an own receiver is associated with each transmitter—one of the receivers does not work correctly or if an electronic error of whatever kind is present. The presence of such an interference at the same time for both "individual distance measurers" is extremely unlikely which is why in the case of one deviation recognized by way of comparison one can draw conclusions on an interference in one of the two "individual distance measurers".

The invention is thus based on the recognition that for a recording apparatus that includes a plurality of transmitters respectively of individual distance measurers this can not only be used for the improvement of the scanning speed and the resolution, but at the same time practically without an increase in demand in effort and cost also for a self-diagnostics or a safety function.

In this way the apparatus in accordance with the invention can satisfy high requirements with regard to safety, as in the case of a recognized interference, the apparatus can signalize this or let this fact be known or can carry out a different kind of safety measure of whatever design. The safety of the recording apparatus or of a larger installation operated with the aid thereof, e.g. a measurement system, a vehicle or a transport or handling unit, such as for example a crane, can be reliably established in this way.

It is of advantage that the comparison of the distance image points, this means the corresponding measurement values, can take place in parallel to the normal mode of recording operation and merely has to be implemented by way of software.

In accordance with the invention a respective comparison can take place e.g. within a scanning pattern or within a distance profile. In the latter case a few or—preferably—all distance image points of a transmitter can be referred to as a part profile or a sub-profile in the distance profile that is compared to a part profile or a sub-profile that is formed by a few or—preferably—all distance image points of the other transmitter.

Figure 2:
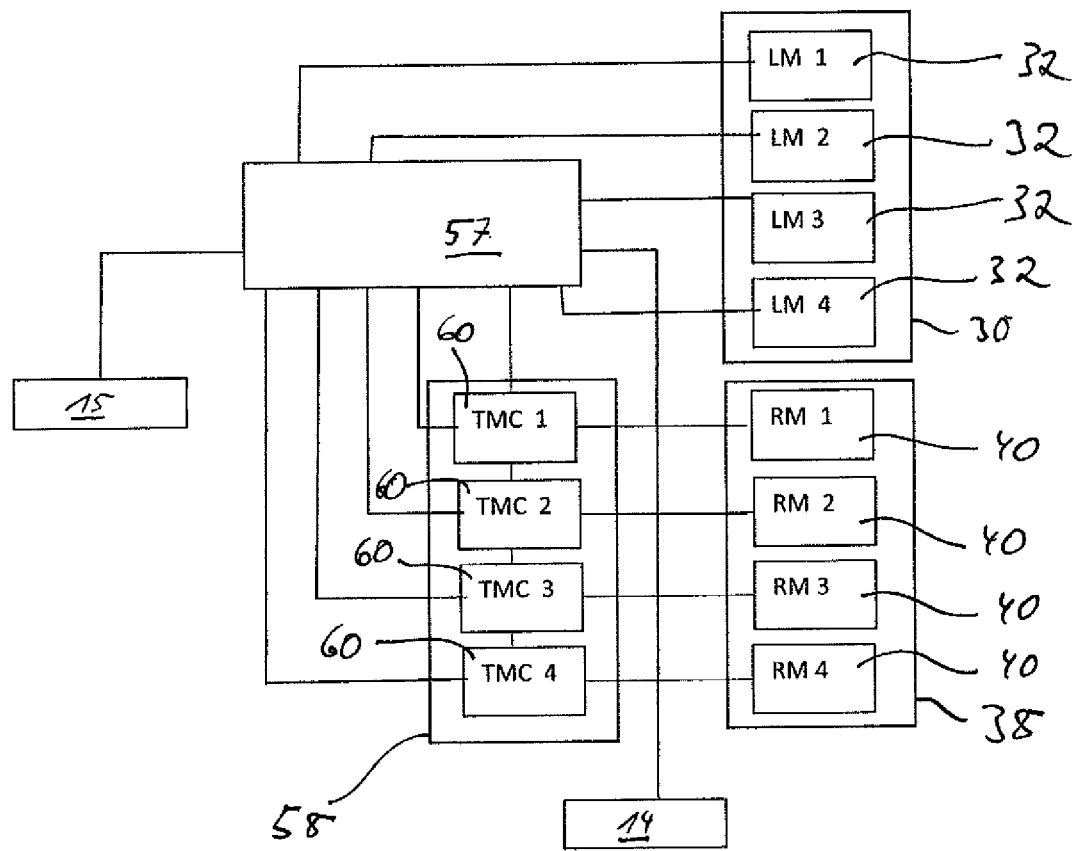
Figure 3B:
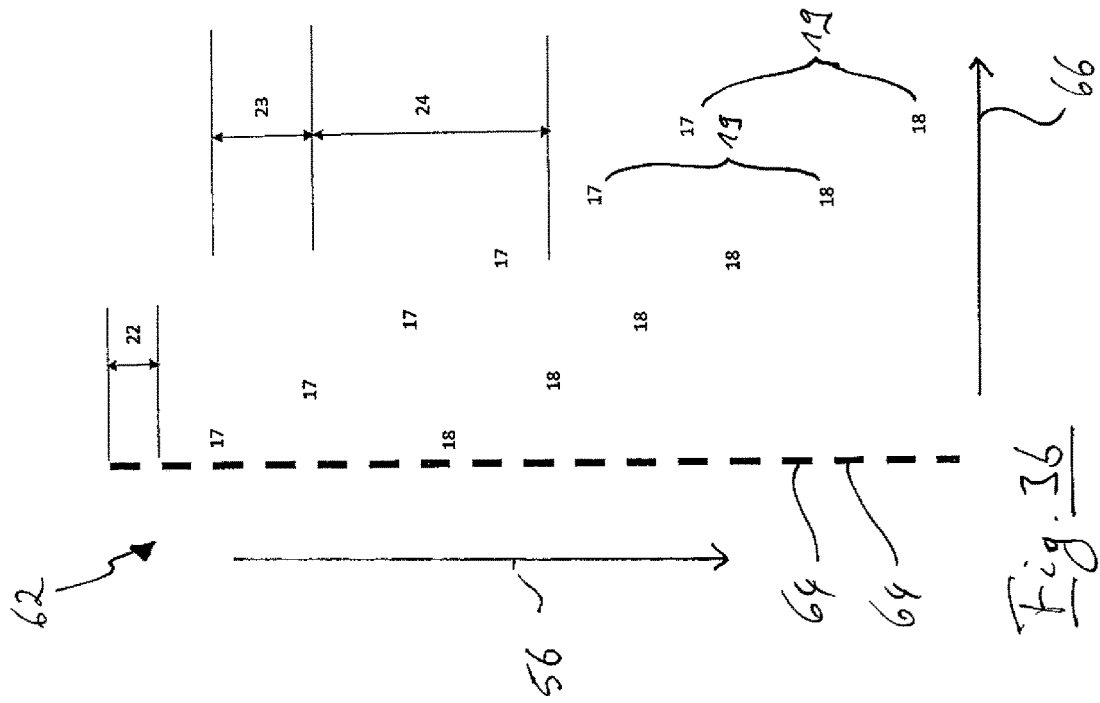
Figure 3A:
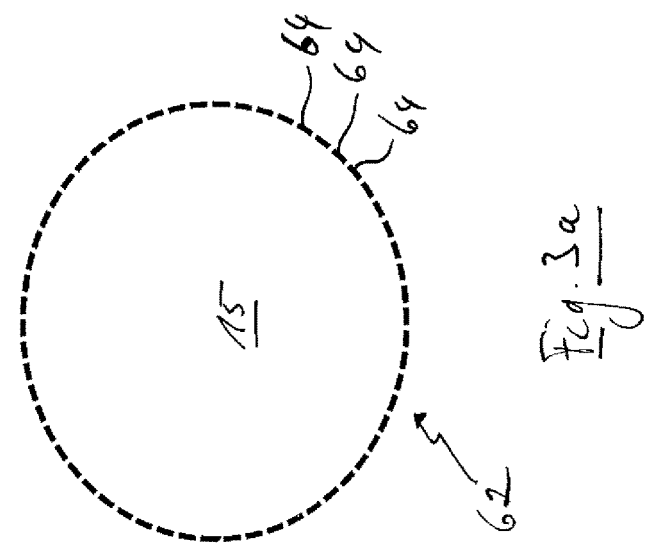
Figure 4:
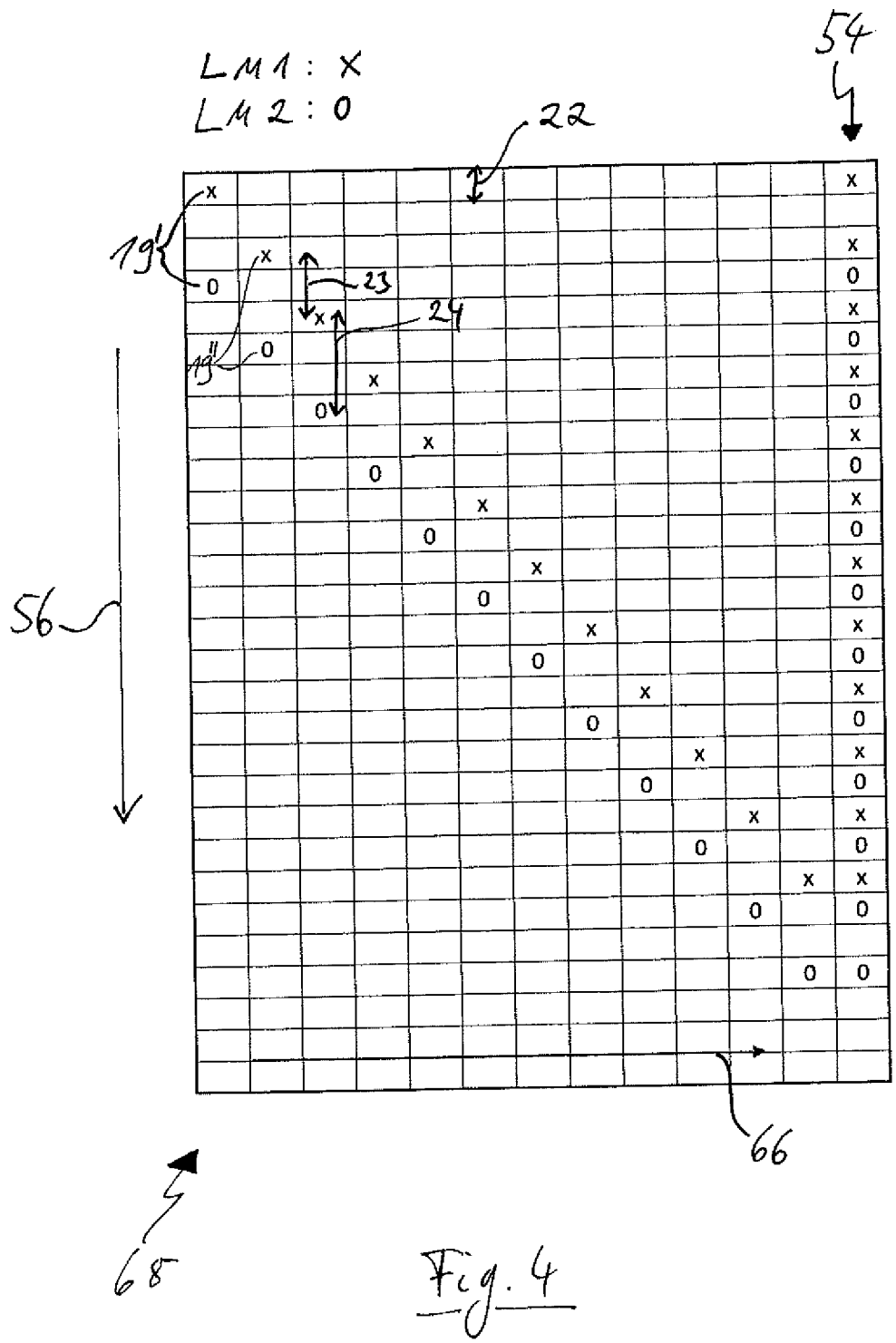
Figure 5:
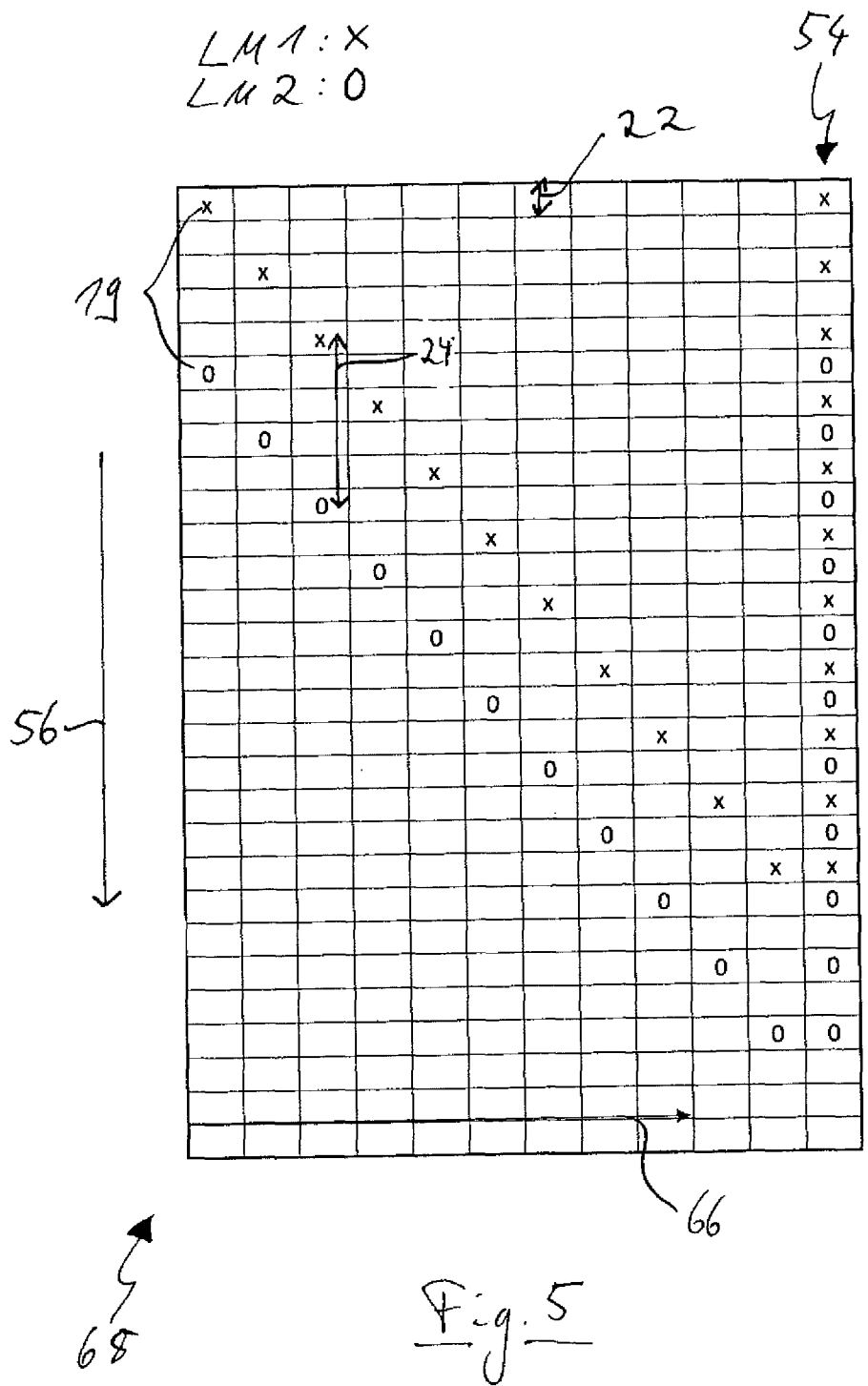
Figure 6:
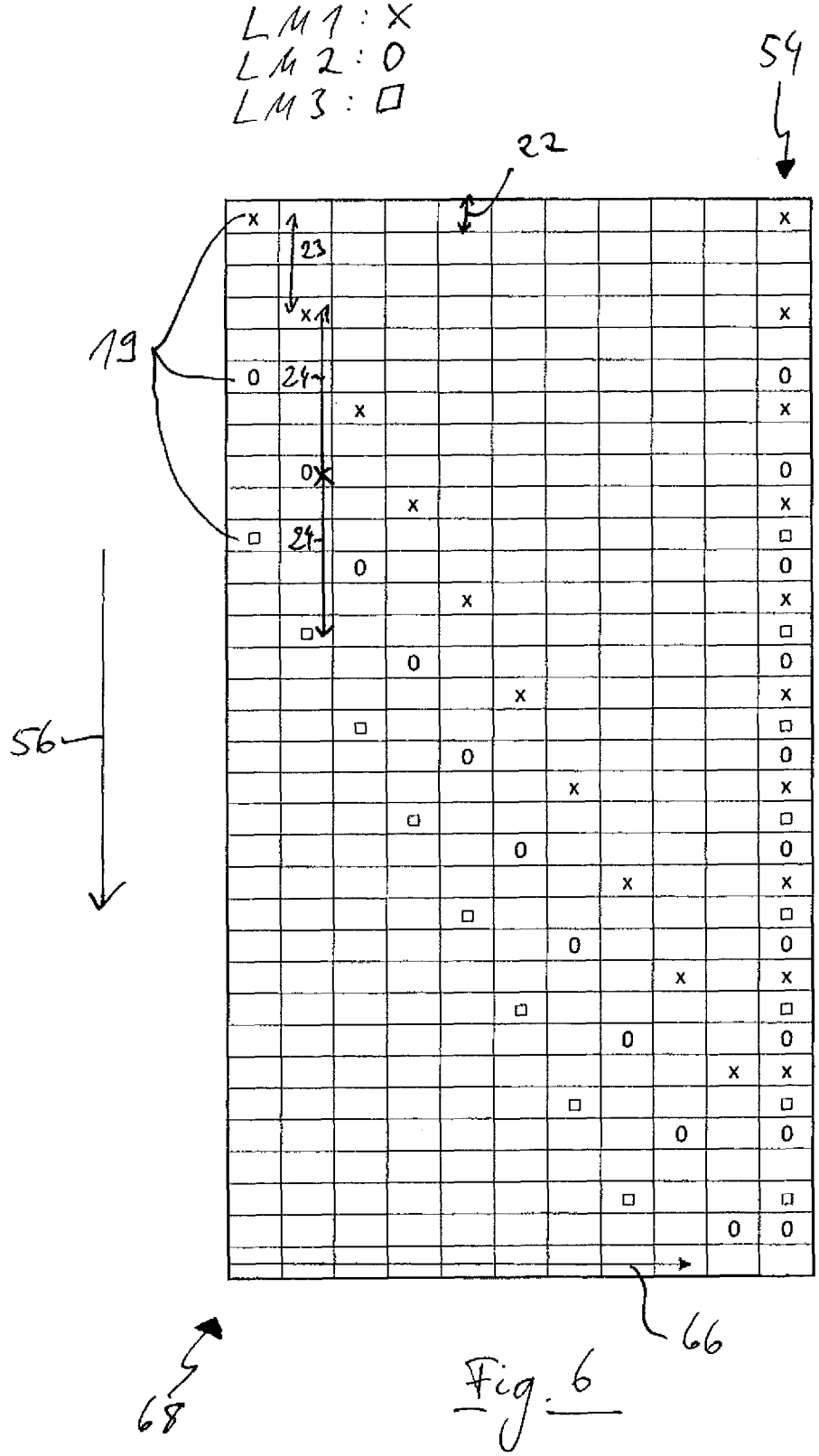
Figure 7:
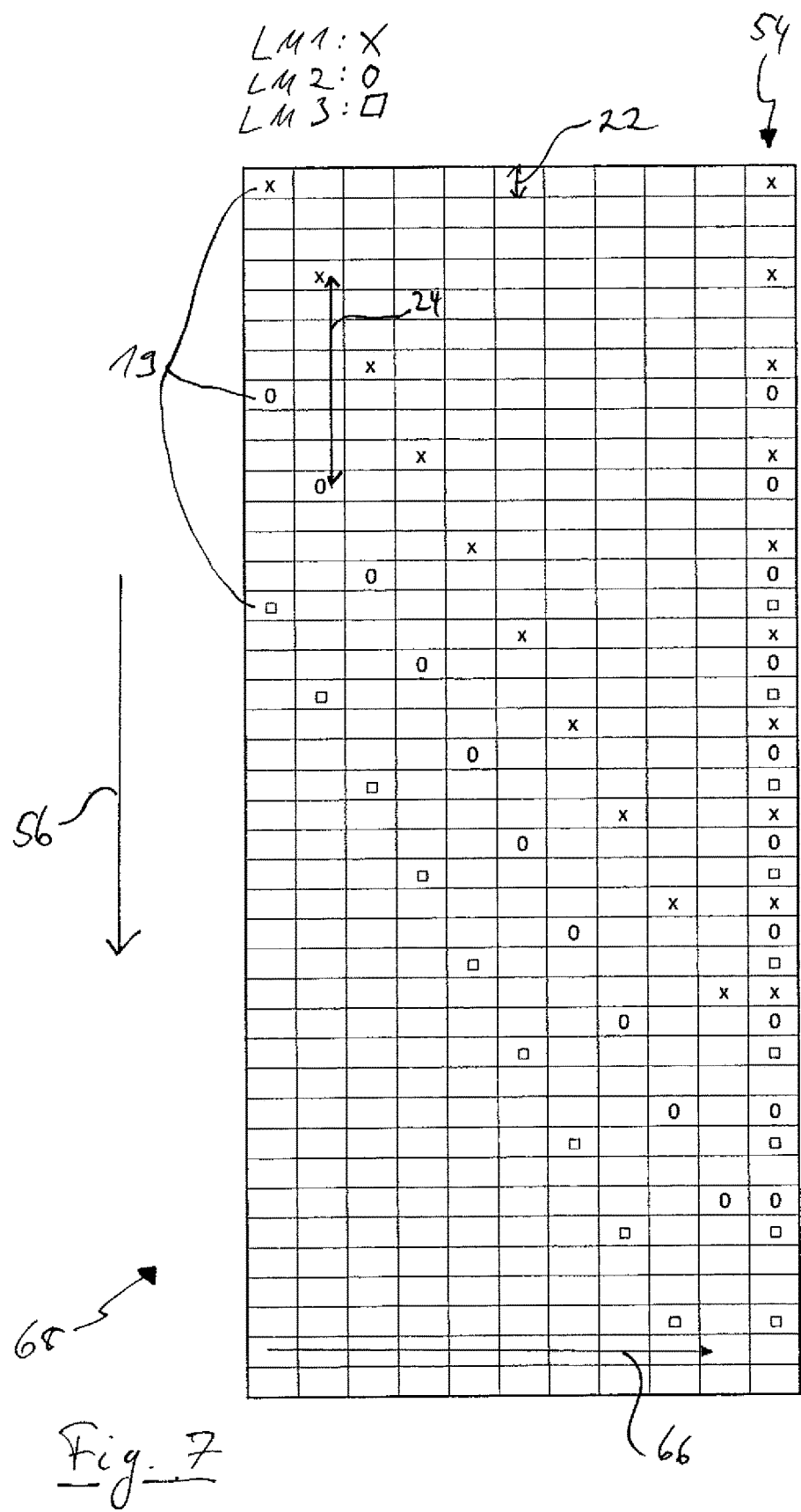
Figure 8:
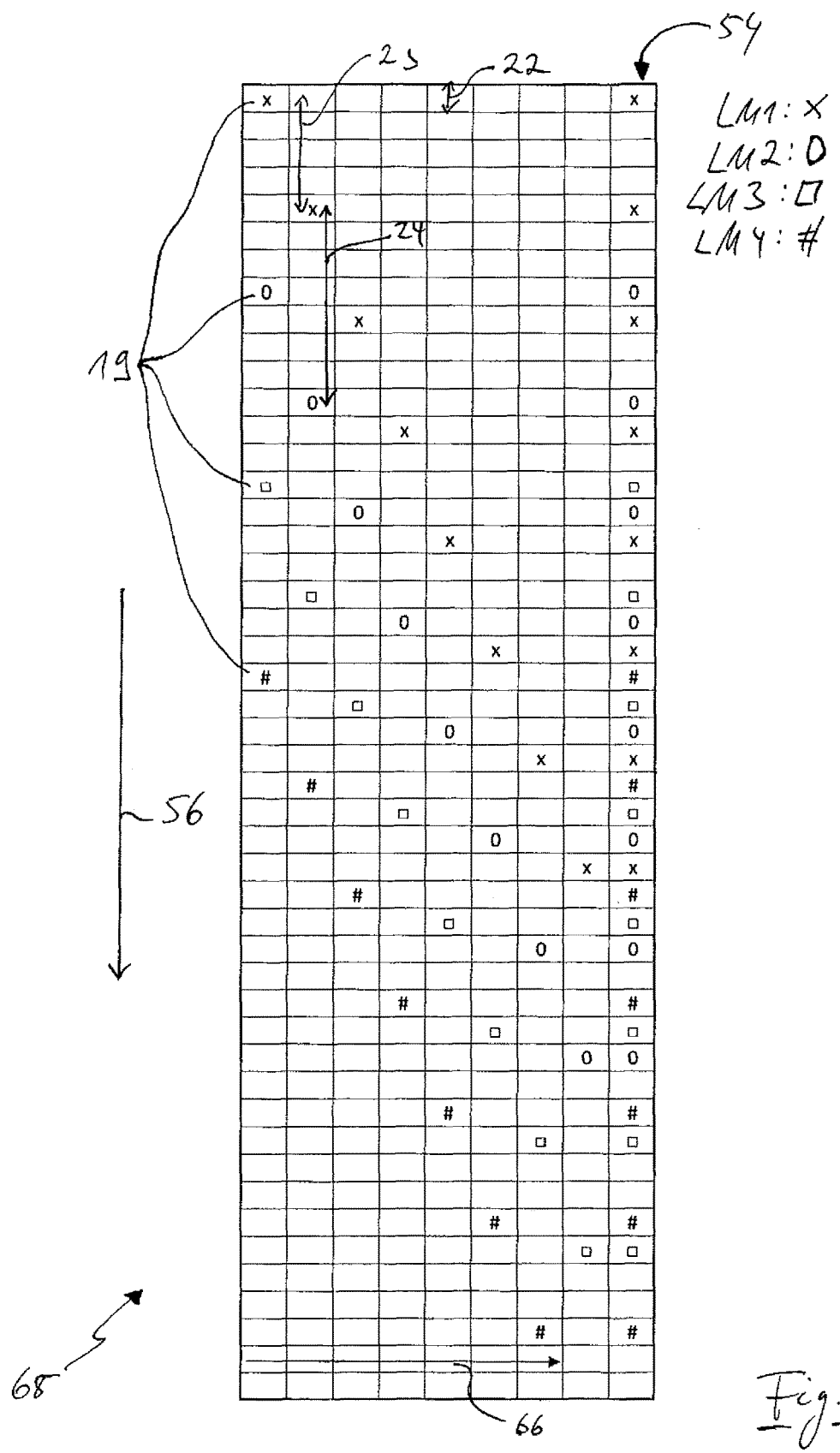

The invention will be described in the following merely by way of example with reference to the submitted drawing in which is shown:

FIG. 1 an apparatus for the recording of distance profiles with two transmitters and two receivers;

FIG. 2 a block circuit diagram of an apparatus for recording distance profiles with four transmitters and four receivers;

FIG. 3a a schematic illustration of a coding section of a scanning angle measurement unit for the apparatus of FIG. 1;

FIG. 3b a schematic illustration of a plurality of scanning patterns displaced against one another;

FIG. 4 a schematic illustration of consecutively generated scanning patterns of the length 2 and a resultant distance profile;

FIG. 5 a schematic illustration of consecutively generated scanning patterns of the length 2 and a resultant distance profile;

FIG. 6 a schematic illustration of consecutively generated scanning patterns of the length 3 and a resultant distance profile;

FIG. 7 a schematic illustration of consecutively generated scanning patterns of the length 3 and a resultant distance profile; and FIG. 8 a schematic illustration of consecutively generated scanning patterns of the length 4 and a resultant distance profile.

In FIG. 1 an apparatus 10 is shown that comprises two transmitters 32 ("LM1" and "LM2") arranged in an array 30 and a reception unit 36. The reception unit 36 comprises two receivers 40 ("RM1" and "RM2") arranged in an array 38. The apparatus 10 further comprises a deflection unit 42 having a polygonal mirror 44 that can be rotated about an axis of rotation 16 and that has four deflection surfaces 11 (merely two deflection surfaces 11 are visible in FIG. 1) configured as planar and extending in parallel to the axis of rotation 16. The deflection surfaces 11 are respectively perpendicular to one another. The polygonal mirror 44 can be rotated by way of a drive means 14. An angle encoder 15 is provided, whose functional principle will be described in more detail in the following, in order to measure the rotational angular position of the polygonal mirror 44.

The transmitters 32 by way of example are laser diodes, in particular GaAs laser diodes that are respectively configured to transmitt bunches of beams 12 (laser pulses) into a recording region 46. Respective distance image points 17, 18 are determined by means of the bunches of radiation 12 in the recording region 46 and indeed by way of a respective measurement of the time of flight of the bunches of radiation 12 of a transmitter 32 into the recording region 46 and of a respectively reflected bunch of radiation 13 to a receiver 40 (LM1 to RM1 and LM2 to RM2).

A distance image point 17, 18 is a respective point (point of reflection) in the recording region 46 at which an associated bunch of radiation 12 is reflected. Mathematically a distance image point 17, 18 is described (i) by the spacing between the apparatus 10 and the point of reflection in the recording region 46 and (ii) the rotational angular position of the polygonal mirror 44 set on a transmission of the bunch of radiation 12. In the following reference will always be made to "distance image points", wherein this means both the respective point of reflection in the recording region 46 as also its image and/or mathematical description.

By way of example the generation of respective scanning patterns 19 is illustrated in FIG. 1 with the scanning patterns comprising a respective pair of distance image points 17, 18 at which the shown bunches of radiation 12 end and pass over into the reflected bunches of radiation 13. The scanning pattern 19 explicitly referred to in FIG. 1 is part of a distance profile 54 which is illustrated in part in FIG. 1. The distance profile 54 is generated by way of generation of a plurality of scanning patterns 19 displaced against one another, as will be explained in more detail in the following. The offset between the scanning patterns 19 takes place in a scanning direction 56 and is brought about by a rotation of the polygonal mirror 44.

The bunches of radiation 12, 13 are merely indicated in FIG. 1 by way of a respective line. This however does not mean that the bunches of radiation 12, 13 have to be optically limited to these lines. Rather, in particular the transmitted bunches of radiation 12 can diverge starting from the transmitter 32 and have a non-negligible width respectively "a spot size". This is in particular indicated by the oval shaped distance image points 17, 18. It is understood that the distance image points 17, 18 are shown merely by way of example and do not have to correspond to the actual size or shape.

The apparatus 10 further comprises an optical system 48 having a transmission lens 50 and a reception lens 52. It is understood that the optical system 48 can also be of different design and that it can in particular be formed by a common transmission and reception lens (not shown). Furthermore, the apparatus 10 can comprise further non-shown elements, for example, a housing having a window through which the bunches of radiation 12, 13 can penetrate into and/or exit from the housing.

FIG. 2 shows a block circuit diagram of a further apparatus 10 (not shown) for recording distance profiles 54, wherein deviating from the apparatus 10 of FIG. 1 four transmitters 32 (LM1 to LM4) and four receivers 40 (RM1 to RM4) are provided. The transmitter array 30, the reception unit 38, the drive means 14 for the deflection unit 42, as well as the angular encoder 15 are connected to a control unit 57. An evaluation unit 58 is interconnected between the reception unit 38 and the control unit 57, with the evaluation unit comprising four evaluation modules 60 (TMC1 to TMC4). Each evaluation module 60 (TMC: Time Measurement Channel) is configured to determine the time of flight between the transmission of a bunch of radiation 12 and the reception of the reflected bunch of radiation 13 for a respective pair of transmitter 32 and receiver 40. The distance of the respective distance image point 17, 18 can be determined from the time of flight.

FIG. 3a and FIG. 3b serve the purpose of explaining the association between the rotational position of the polygonal mirror 44 of the deflection unit 42 and the generation of scanning patterns 19 by way of the transmitter 32. A coding section 62 of the angular encoder 15 of FIG. 1 is schematically shown in FIG. 3a. The coding section 62 comprises a sequence of equally spaced apart markings 64 which are circumferentially arranged about the axis of rotation 16 of the angular encoder 15. The coding section 62 is coupled to the polygonal mirror 44 in such a way that the coding section 62 always rotates together with the polygonal mirror 44.

The number of markings 64 can be adapted in dependence on a desired spacing between the distance image points 17, 18 of a respective distance profile 19. For example, the coding section 62 can have 8,000 markings 64 that can be detected by means of a non-shown optical detection unit. Thus, the encoder 15 could measure the angle with a resolution of 360°/8,000=0.045° per marking. By means of an X-Or logic the resolution can be multiplied by four, this means the encoder 15 can then measure the angle with an accuracy of 0.01125°.

In dependence on the angle of rotation measured by way of the encoder 15 individual bunches of radiation 12 can now be generated. Due to the resolution of the encoder 15 a minimum spacing between consecutively bunches of radiation 12 and/or distance image points 17, 18 that can be generated results. This minimum spacing is referred to as minimum increment 22 and is drawn in in FIG. 3b. The minimum increment 22 is actually twice as large as the previously mentioned encoder accuracy of 0.01125°, this means it amounts to 0.02250°, due to the reflection of the bunches of radiation 12 at the polygonal mirror 44.

In FIG. 3b a part of the coding section 62 is illustrated as straightened and enlarged. In dependence on the angular position of the polygonal mirror 44 respectively of the coding section 62 the scanning patterns 19 respectively comprising a pair of distance image points 17, 18 are now consecutively generated (see the axis in time 66), this means that the two transmitters 32 are simultaneously activated in order to respectively transmit a transmission pulse for each position of rotation of the polygonal mirror 44 corresponding to a respective marking 64. In the case illustrated in FIG. 3b the spacing 23 between two consecutively generated scanning patterns 19, this means the offset amounts to two steps or markings 64, this means twice the increment 22. The spacing 24 between the distance image points 17, 18 of a respective scanning pattern 19 amounts to five steps.

In FIG. 4 to FIG. 8 a respective scheme 68 is illustrated that emphasizes the recording of a respective distance profile 54. In FIG. 4 starting at the top left initially a first scanning pattern 19' is generated with two distance image points x and 0, wherein the distance image point x can correspond to the distance image point 18 and the distance image point 0 can correspond to the distance image point 17 of FIG. 1. The generated distance image points x, 0 are stored for the distance image 54 which is illustrated at the right side of the scheme 68 and extends downwardly from the top in the vertical direction. Now the rotating mirror 44 is turned further by two increments 22 or markings 64 and a further scanning pattern 19" is generated whose distance image points x, 0 are stored again. This further scanning pattern 19" is displaced in the scanning direction 56 by two increments 22 (spacing 23). The spacing 24 of the distance image points x, 0 of a scanning pattern 19, however amounts to three increments 22 in such a way that the consecutively generated scanning patterns 19', 19" overlap one another and/or are interlaced with one another, wherein the distance image points x, 0 lie in different points of rest. With regard to time, the distance image point x of the scanning pattern 19" is hereby generated after the distance image point 0 of the scanning pattern 19', although this distance image point 0 lies in front of the later generated image point x of the scanning pattern 19" in the scanning direction 56. The sequence in time of the distance image points x, 0 thus partially does not correspond to the spatial sequence of the distance image points x, 0 in the scanning direction 56 of the resultant distance profile 54.

Further scanning patterns 19 are now generated with a constant offset and are stored until a desired scanning angle region (not illustrated) has been completely scanned. Subsequently all stored distance image points x, 0 are combined to the distance profile 54. As can be recognized clearly from FIG. 1 the distance image points x, 0 are, apart from a start region and an end region, uniformly spaced apart from one another and indeed each with the spacing of an increment 22. The further spaced apart distance image points x, 0 at the ends of the distance profile 54 can be neglected or excluded from the determination of an actually interesting recording profile.

So that no distance image points x, 0 are generated twice or gaps arise in distance profile 54, the offset between the scanning pattern 19 is set to the number of distance image points x, 0 per scanning pattern 19 in the unit of the increment 22, in FIG. 1 this thus means two increments 22. The spacing 24 between the distance image points x, 0 of the scanning pattern 19 in FIG. 1 amounts, as mentioned, to three increments 22. This spacing 24 can be increased e.g. in order to counteract an optical cross-talk between the bunches of radiation 12, 13 generating the distance image points x, 0 of individual scanning patterns 19. It is then also possible to arrange the laser diodes 32 and the reception diodes 40 physically next to one another. For this purpose the equation $d=2\cdot(A+k)-1$ can be used, wherein A is the number of distance image points x, 0 of the scanning pattern 19 and k is a spacing factor from the group of non-negative whole numbers. In FIG. 1 the following is true for the spacing 24: $d=2\cdot(2+0)-1=3$.

The scheme 68 of FIG. 5 likewise shows the recording of a distance profile 54 with scanning patterns 19 which each comprise two distance image points x, 0. The spacing 24 here however amounts to five increments 22, the offset amounts to two increments 22. This spacing 24 results from the above equation of the spacing factor k=1, this means $d=2\cdot(2+1)-1=5$. As is emphasized by the distance profile 54 in FIG. 5 two distance image points x, 0 are respectively present at the start and at the end of the scanning process for the distance profile 54 that are spaced apart from one another with two increments 22. These can be neglected or omitted in analogy to the outer distance image points x, 0 of the distance profile 54 of FIG. 4.

The scheme 68 of FIG. 6 shows the recording of a distance profile 54 for the case of three transmitters 32 (LM1, LM2, LM3) and three receivers (RM1, RM2, RM3) that respectively generate a distance image point x, 0, □. The spacing 24 between the distance image points x, 0, □ of a respective scanning pattern 19 amounts to five increments 22 as result for k=0 from the equation $d=2\cdot(3+0)-1=5$. The offset 23 results in three increments 22 from the number of the distance image points respectively from the number of the transmitters 32.

The scheme 68 of FIG. 7 corresponds to the case of FIG. 6, wherein deviating therefrom the spacing 24 with the spacing factor k=1 in accordance with the equation amounts to d=2·(3+1)−1=7 increments 22.

The scheme 68 of FIG. 8 shows the recording of a distance profile with four transmitters 32 (LM1, LM2, LM3, LM4), this means with a respective scanning pattern 19 which generates four distance image points x, 0, □, #. The spacing 24 between the distance image points amounts to d=2·(4+0)−1=7 increments 22. The offset 23, corresponding to the number of transmitters 32, amounts to four increments 22.

A comparison of the schemes 68 of FIG. 4 to FIG. 8, on the one hand, shows that the scanning speed can be increased in that the number of distance image points x, 0, □, # is increased for each scanning pattern 19. On the other hand, the number of gaps between the outer distance image points x, 0, □, # of the distance profile 54 also increases, this means that comparatively more scanning patterns 19 have to be generated until the distance image points x, 0, □, # of the distance profile 54 are uniformly displaced apart with the increment 22. This effect is thus also present in connection with the spacing factor k, this means the larger k is selected the more scanning patterns 19 have to be recorded until the "incremental resolution" is achieved. In view of the background of this effect, the number of distance image points per distance profile 54 can be selected sufficiently high, as e.g. approximately 1,000 distance image points. In the most cases of application the gaps between the outer distance image points can then be neglected.

LIST OF REFERENCE NUMERALS

10 apparatus
11 deflection surface
12 transmitted bunch of radiation
13 received bunch of radiation
14 drive means
15 angular encoder
16 axis of rotation
17 distance image point
18 distance image point
19 scanning pattern
22 increment
23 offset
24 spacing
30 laser array
32 transmitter
36 reception unit
38 receiver array
40 receiver
42 deflection unit
44 polygonal mirror
46 recording region
48 optical system
50 transmission lens
52 receiver lens
54 distance profile
56 scanning direction
57 control unit
58 evaluation unit
60 evaluation module
62 coding section
64 marking
66 axis in time
68 scheme

The invention claimed is:

1. An apparatus for recording distance profiles each having a plurality of distance image points, the apparatus comprising:
at least two transmitters connected to a control unit and arranged in a transmitter array respectively for a transmission of electromagnetic radiation into a recording region;
at least one reception unit for a detection of radiation reflected from the recording region, the reception unit comprising at least two receivers;
an evaluation unit for determining the distances of objects at which the transmitted electromagnetic radiation is reflected, with the distances each forming a distance image point, the evaluation unit connected to the reception unit and the control unit, the evaluation module determining the distances by measuring the time of flight and/or the phase shift of the electromagnetic radiation between at least one of the two transmitters and at least one of the two receivers; and
a deflection unit comprising a rotating mirror which deflects the transmitted electromagnetic radiation within a scanning angle region into a scanning direction in order to, per distance profile, consecutively generate a plurality of scanning patterns of distance image points, with the distance image points being displaced against one another in the scanning direction and with the distance image points each imaging the transmitter array;
wherein at least a few of the distance image points are spaced apart from one another in the scanning direction in each of the scanning patterns.

2. The apparatus in accordance with claim 1, wherein a respective scanning pattern has a maximum longitudinal extent in the scanning direction and a maximum transverse extent perpendicular to the longitudinal extent, wherein the transverse extent is smaller than the longitudinal extent.

3. The apparatus in accordance with claim 1, wherein, in a respective scanning pattern, the distance image points lie on a straight line that extends at least essentially in parallel to the scanning direction.

4. The apparatus in accordance with claim 1, wherein the distance image points of a respective scanning pattern are uniformly spaced apart.

5. The apparatus in accordance with claim 1, wherein a spacing between adjacent distance image points of a respective scanning pattern is larger than or equal to the maximum width of the bunch of radiation transmitted by the transmitters.

6. The apparatus in accordance with claim 1, wherein at least a few of the scanning patterns of a respective distance profile overlap one another.

7. The apparatus in accordance with claim 1, wherein the distance image points of a respective distance profile are uniformly spaced apart.

8. The apparatus in accordance with claim 1, wherein a spacing between adjacent distance image points of a respective scanning pattern is larger than the spacing between adjacent distance image points of a respective distance profile.

9. The apparatus in accordance with claim 1, wherein an offset between two consecutive scanning patterns is equal to the product of the number of distance image points of a respective scanning pattern and a spacing between adjacent distance image points of a respective distance profile.

10. The apparatus in accordance with claim 1, wherein for a—stated in multiples of a spacing between adjacent distance image points of a respective distance profile—spacing d between adjacent distance image points of a respective scanning pattern the following is true:

$$d=2\cdot(A+k)-1;$$

wherein
- A is the number of distance image points of the scanning pattern; and
- k is a spacing factor selected from the group of non-negative whole numbers.

11. The apparatus in accordance with claim 1, wherein the deflection unit comprises a polygonal mirror rotatable about an axis of rotation that has n deflection surfaces that can consecutively be impinged by the transmitted radiation and that each cover has a same angular range of at least approximately 360°/n.

12. The apparatus in accordance with claim 11, wherein the deflection surfaces extend in parallel to the axis of rotation of the polygonal mirror.

13. The apparatus in accordance with claim 1, wherein the scanning angle position of the deflection unit can be detected by means of a scanning angle measurement unit.

14. The apparatus in accordance with claim 13,
wherein the scanning angle measurement unit has a coding section coupled to the deflection unit;
wherein the coding section is provided with spaced apart markings;
wherein the scanning angle measurement unit has a detection unit stationary relative to the coding section to detect the markings of the coding section;
wherein the scanning angle measurement unit is adapted to detect the scanning angle position of the deflection unit on the basis of one or more detected markings of the coding section.

15. The apparatus in accordance with claim 1, wherein the arrangement of the transmitters in the transmitter array corresponds to the arrangement of distance image points in a respective scanning pattern.

16. The apparatus in accordance with claim 1, wherein the number of the transmitters amounts to between 2 and 32.

17. The apparatus in accordance with claim 1, wherein a spacing between two transmitters lying directly next to one another lies in the range of 1 to 12 mm.

18. The apparatus in accordance with claim 17, wherein the spacing between two transmitters lying directly next to one another amounts to approximately 6 mm.

19. A method of recording distance profiles each having a plurality of distance image points, in which method
electromagnetic radiation is transmitted into a recording region by at least two transmitters arranged in a transmitter array;
radiation reflected from the recording region is detected by at least one reception unit comprising at least two receivers;
a plurality of distances of objects at which the transmitted electromagnetic radiation is reflected is determined, with the distances each forming a distance image point, wherein determining the distances includes measuring the time of flight and/or the phase shift of the electromagnetic radiation between at least one of the two transmitters and at least one of the two receivers; and
the transmitted radiation is deflected by a rotating mirror into a scanning direction within a scanning angle region in order to consecutively generate, per distance profile, a plurality of scanning patterns of distance image points that are displaced against one another in the scanning direction and that each image of the transmitter array in such a way that at least a few of the distance image points are spaced apart from one another in the scanning direction.

20. The method in accordance with claim 19, wherein not all distance image points of a respective scanning pattern are detected at a same point in time.

\* \* \* \* \*